United States Patent [19]

Okaniwa

[11] Patent Number: 5,568,579
[45] Date of Patent: Oct. 22, 1996

[54] WAVEGUIDE COUPLING DEVICE INCLUDING TAPERED WAVEGUIDE WITH A PARTICULAR TAPERED ANGLE TO REDUCE COUPLING LOSS

[75] Inventor: Kaoru Okaniwa, Kawagoe, Japan

[73] Assignee: Hoechst Aktiengesellschaft, Germany

[21] Appl. No.: 510,390

[22] Filed: Aug. 2, 1995

[30] Foreign Application Priority Data

Aug. 4, 1994 [JP] Japan .................................. 6-183513

[51] Int. Cl.$^6$ ...................................................... G02B 6/26
[52] U.S. Cl. .............................. 385/43; 385/29; 385/49; 385/50
[58] Field of Search .................... 385/43, 39, 44, 385/45, 48, 49, 50, 27–30, 14

[56] References Cited

U.S. PATENT DOCUMENTS

| | | | |
|---|---|---|---|
| 3,992,079 | 11/1976 | Giallorenzi | 385/30 |
| 4,943,129 | 7/1990 | Takeda et al. | 385/43 |
| 5,087,109 | 2/1992 | Ishizuka et al. | 385/34 |
| 5,208,882 | 5/1993 | Strasser et al. | 385/43 X |
| 5,473,710 | 12/1995 | Jaw et al. | 385/43 X |

FOREIGN PATENT DOCUMENTS 52-38240  3/1977  Japan ........................................ 385/43

OTHER PUBLICATIONS

Patent Abstracts of Japan, vol. 006, No. 229, (P–155), Nov. 16, 1982 & JP–A–57 132105.
Patent Abstracts of Japan, vol. 009, No. 296, (P–407), Nov. 22, 1985 & JP–A–60–133408.
Patent Abstracts of Japan, vol. 012, No. 331, (P–755), Sep. 7, 1988 & JP–A–63–094205.
Patent Abstracts of Japan, vol. 017, No. 035, (E–1310), Jan. 22, 1993 & JP–A–04–255270.
Database WPI, Section Ch, Week 9348, Derwent Publications Ltd. London, GB, Class A89, AN 93–380183 & JP–A–05 281 587. Oct. 1993.
Reinhart et al, "GaAs–AlGaAs double heterostructure lasers with taper–coupled passive waveguides", Applied Physics Letters, vol. 26, No. 9, pp. 516–518.

Primary Examiner—Rodney B. Bovernick
Assistant Examiner—Hemang Sanghavi
Attorney, Agent, or Firm—Curtis, Morris & Safford, P.C.

[57] ABSTRACT

A waveguide device comprising a cladding layer having a refractive index $n_{cl}$, a first waveguide having a refractive index $n_g$ ($n_g > n_{cl}$) formed on said cladding layer, and a second waveguide having a refractive index $n_{cp}$ ($n_{cp} > n_g$) formed on said first waveguide, wherein the sectional shape of said second waveguide has a tapered structure in which a layer thickness of said second waveguide reduces as the distance from the end face of the waveguide increases, and a tapering angle $\Theta$ in said tapered structure satisfies the following conditions:

$$\Theta_a = \{90° - \arcsin(n_{eff}/n_{cp})\}/2 \qquad (1)$$

$$\Theta < 2.0\,\Theta_a \qquad (2)$$

wherein $n_{eff}$ represents an effective refractive index of said first waveguide. This waveguide device has a high resistance against the deviation in the positions of the light exit face of an LD or an optical fiber and the light entrance face of a waveguide and thus enables an optical coupling at a high efficiency.

1 Claim, 8 Drawing Sheets

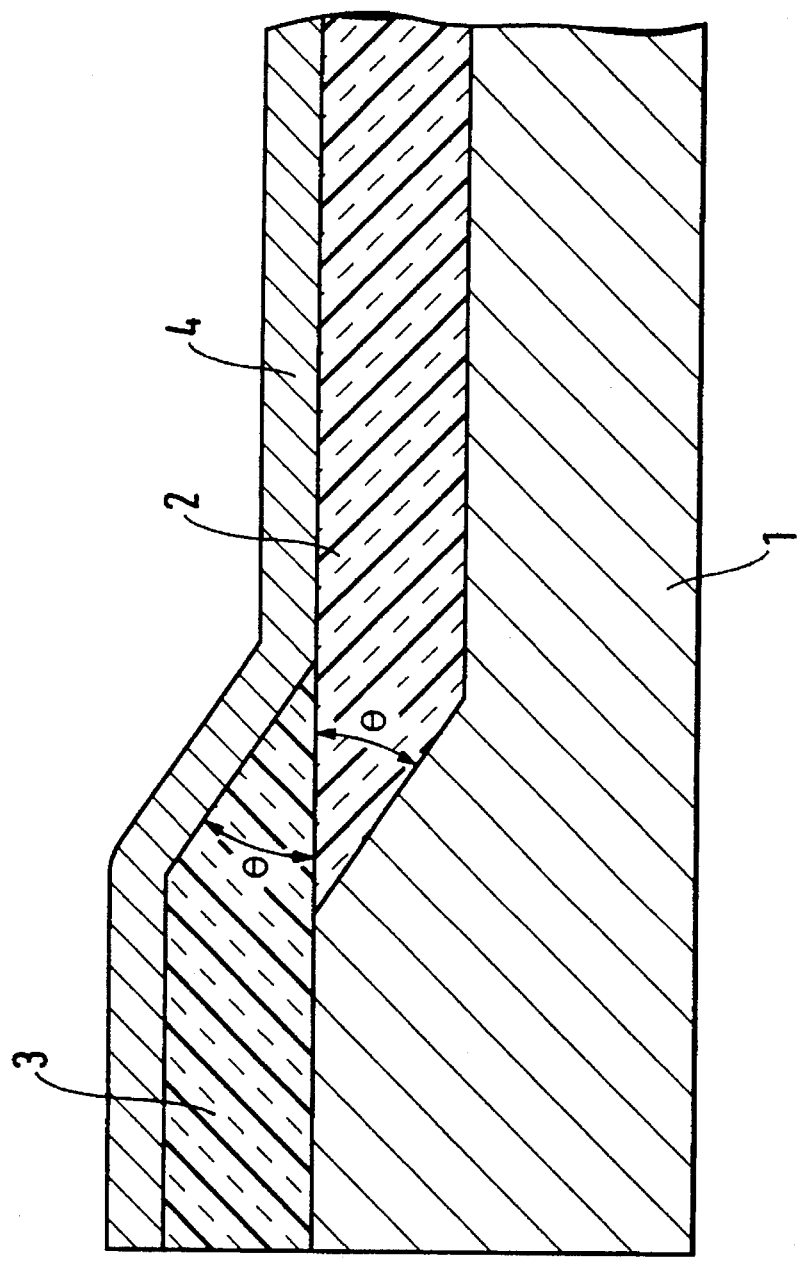
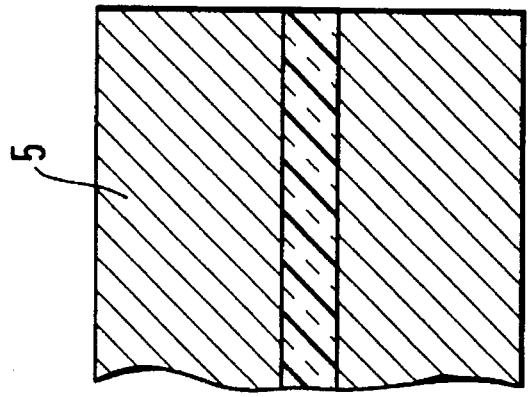
Fig. 3

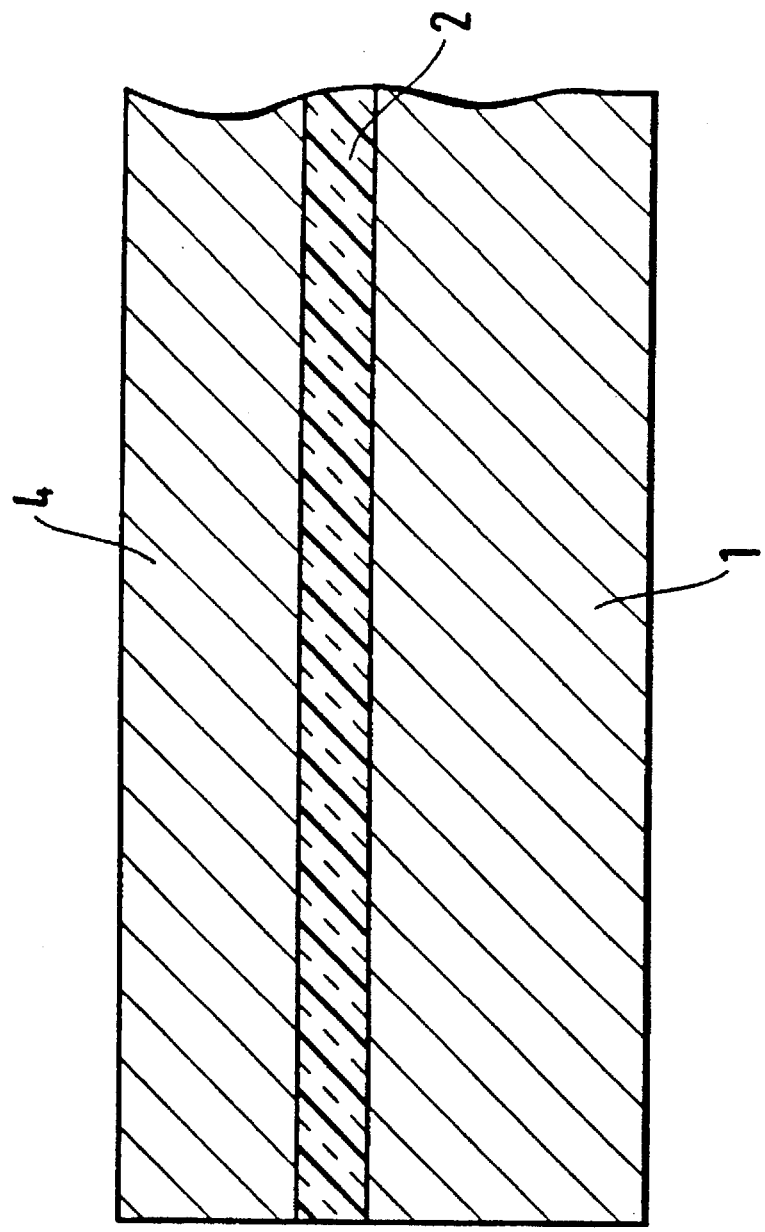
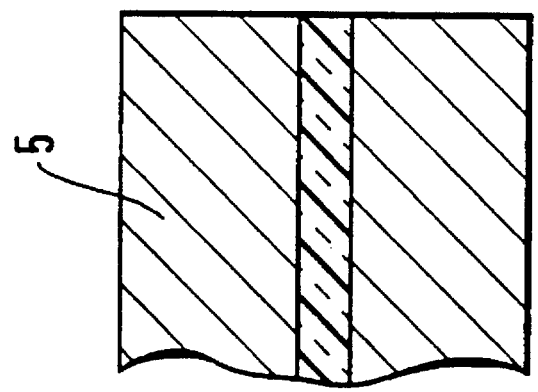
Fig. 6
PRIOR ART

WAVEGUIDE COUPLING DEVICE INCLUDING TAPERED WAVEGUIDE WITH A PARTICULAR TAPERED ANGLE TO REDUCE COUPLING LOSS

TECHNICAL FIELD

This invention relates to an improvement of an optical coupling for the optical devices in an integrated optical device. More particularly, it relates to a design of a waveguide, for example, an integrated optical circuit.

BACKGROUND ART

A so-called integrated optical circuit, wherein optical devices such as a semiconductor laser (hereinafter sometimes referred to simply as LD), an optical modulation device and a photodiode (hereinafter sometimes referred to simply as PD) are integrated on a substrate and coupled with to each other via waveguides, aims at downsizing and stabilizing optical systems and improving the performance of the same. Thus studies have been energetically made on these integrated optical circuits as the technology in the next generation. In preparing such an integrated optical device, although preparation of each of the devices is important, the coupling between the optical devices is the most important factor, and an increase in the optical coupling efficiency is desired. In a conventional optical coupling, however, the size and shape of a light exit face of an LD or an optical fiber and the refractive index of on optical fiber would not generally agree with those of a waveguide device (or these factors of the light exit end face of a waveguide would not agree with those of the light entrance end face of the optical fiber or PD). It is therefore theoretically difficult to increase the optical coupling efficiency. Even if the size of the light exit face and refractive index of the optical fiber are approximated closely to those of a waveguide device, fine adjustment is required in order to couple the light exit face of the optical fiber with the light entrance face of the waveguide at a high accuracy in a space. This troublesomeness makes such a waveguide device expensive.

A number of attempts have been made to improve the optical coupling efficiency of such a waveguide device [see, for example, Y. Cai, T. Mizumoto, E. Ikegami and Y. Naito, Lightwave Technol., vol. 9, No. 5 (1991) pp 577–583; Y. Cai, T. Mizumoto and Y. Naito, Trans. IEICE, vol. E71, No. 10, (1988) pp 931–933; Japanese Patent Application Laid-open (Kokai) No. Hei-4-398803; Japanese Patent Application Laid-open (Kokai) No. Hei-4-240809; Japanese Patent Application Laid-open (Kokai) No. Sho-63-94205; Japanese Patent Application Laid-open (Kokai) No. Sho-60-133408; Japanese Patent Application Laid-open (Kokai) No. Sho-63-163407; Japanese Patent Application Laid-open (Kokai) No. Hei-4-255270; Japanese Patent Application Laid-open (Kokai) No, Hei-5-173036; Japanese Patent Application Laid-open (Kokai) No. Hei-5-63216; Japanese Patent Application Laid-open (Kokai) No. Hei-4-283704;

R. G. Hunsperger, "Springer Series in Optical Sciences, Integrated Optics: Theory and Technology", Second Edition (Springer-Verlag 1985) p. 102]. However detailed analysis indicates that no optical coupling with a high efficiency can be achieved in general under the conditions described in these references. At present, therefore, neither any highly effective optical coupling method which exhibits a resistance to the deviation in the positions of a light exit face of an LD or an optical fiber and a light entrance face of the waveguide nor requirements for such a method have been found.

DISCLOSURE OF THE INVENTION

An objective of the present invention is to solve the above-described conventional technical problems and to provide a waveguide device for optical coupling in which each of the devices exhibits the inherent performance thereof sufficiently.

The above objective can be achieved by a waveguide device of the present invention having the structure as will be described hereinbelow. Namely, the present invention provides a waveguide device comprising a cladding layer having a refractive index $n_{cl}$, a first waveguide having a refractive index $n_g$ ($n_g > n_{cl}$) formed on said cladding layer, and a second waveguide having a refractive index $n_{cp}$ ($n_{cp} > n_g$) formed on said first waveguide, wherein the sectional shape of said second waveguide has a tapered structure in which a layer thickness of said second waveguide reduces as the distance from the end face of the waveguide increases, and a tapering angle $\Theta$ in said tapered structure satisfies the following conditions:

$$\Theta_a = \{90° - \arcsin(n_{eff}/n_{cp})\}/2 \quad (1)$$

$$\Theta < 2.0\, \Theta_a \quad (2)$$

wherein $n_{eff}$ represents an effective refractive index of said first waveguide. The term "tapering angle $\Theta$" as used herein means a tapering angle in the direction of the thickness of the tapered structure as shown in FIG. 1.

BRIEF DESCRIPTION OF THE DRAWINGS

FIG. 3 is a drawing showing a waveguide having an optical coupling waveguide for two-direction light and a principal waveguide according to the present invention.

FIG. 6 is a drawing showing a conventional waveguide device having a coupling at end faces.

A: Test Nos. 9 to 13 (in the case of no waveguide for optical coupling).

B: Test Nos. 1 to 4.

C: Test Nos. 5 to 8.

Figure 8:
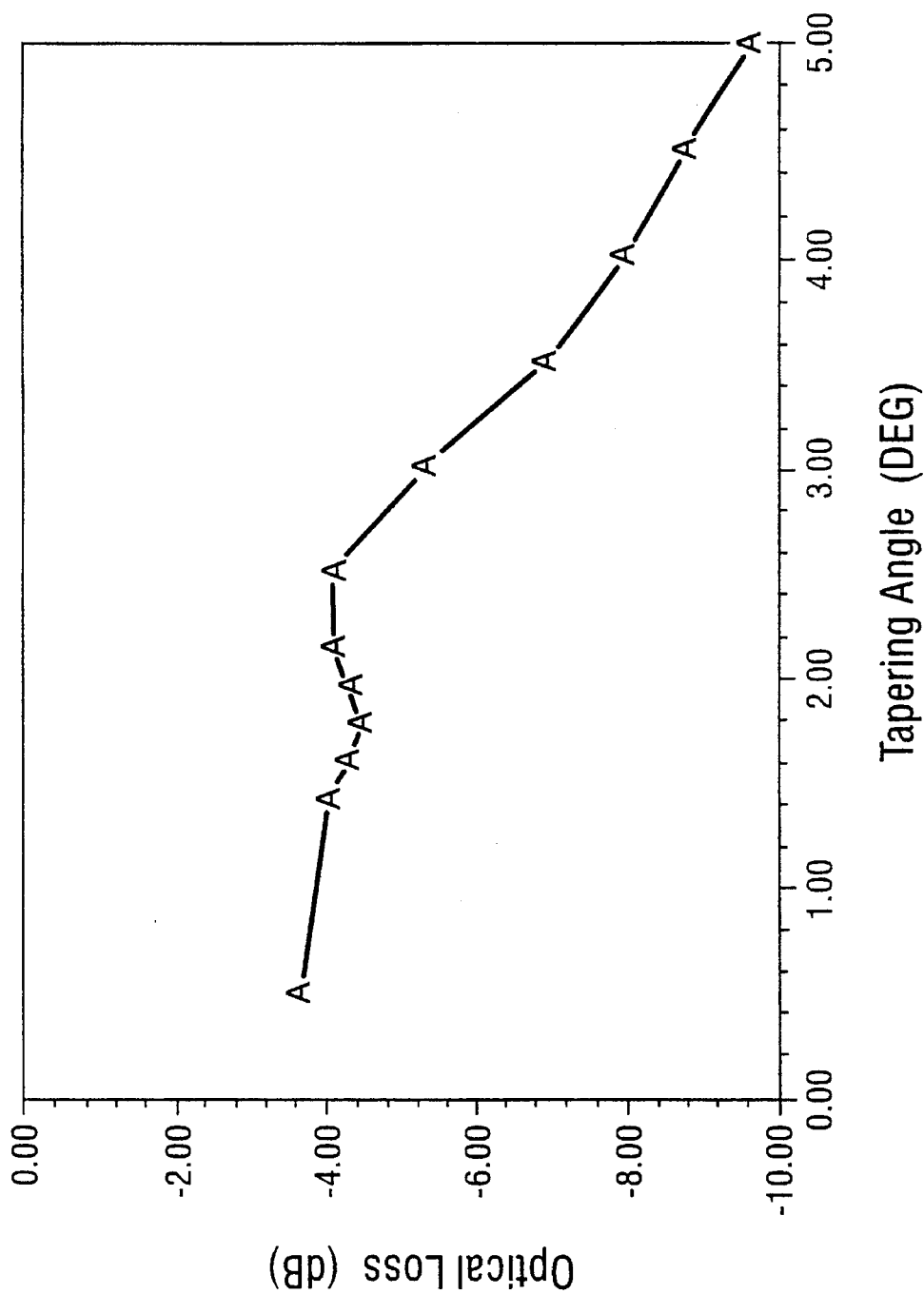

FIG. 8 is a graph showing the loss relative to the tapering angle.

Numerals stand for as follows:

1: substrate (lower clad)
2: waveguiding layer (principal waveguide)
3: waveguide for optical coupling
4: upper cladd
5: optical fiber.

BEST MODE FOR CARRYING OUT THE INVENTION

The above-described first and second waveguides will be referred to respectively as the principal waveguide and the waveguide for optical coupling hereinafter. In the waveguide for optical coupling having a tapered shape, it is considered that the incident light is repeatedly reflected in the tapered portion while increasing the reflection angle each time and thus gradually coupled with the principal waveguide. However this is not always correct. In a single mode waveguide, there exists only one incidence angle which satisfies the phase matching fundamentally, though there is a permissible range of this angle. The reflection angles are 2, 4, 6 . . . (and so on) times larger than the tapering angle $\Theta$. When one of these reflection angles agrees with the incidence angle satisfying the requirements for the phase matching, then the incident light is coupled with the principal waveguide. In other words, an incident light which has been frequently reflected is not coupled with the principal waveguide at a high possibility. Further, when the tapering angle $\Theta$ is not particularly restricted and does not satisfy the phase matching requirements, the coupling scarcely occurs. When the tapering angle is twice or more larger than $\Theta_a$ as given by the formula (1), the coupling efficiency is largely reduced.

In the present invention, it is contemplated that the lightwave of incidence to the waveguide for optical coupling is reflected once at the tapered portion and then coupled with the principal waveguide. The conditions required for designing the waveguide device of the present invention include the predetermined effective refractive index $n_{eff}$ of the principal waveguide, and a refractive index $n_{cp}$ of the waveguide for optical coupling. The effective refractive index $n_{eff}$ of the principal waveguide is generally determined by a numerical calculation. A specific calculation method is described in, for example, K. Okamoto, "Foundation of Waveguide", Corona, CO., 1992, etc. Generally, at the same $n_g$ and $n_{cl}$, $n_{eff}$ increases as the thickness of the waveguiding layer in the slab waveguide increases and the size of the waveguide channel in the channel type waveguide increases, and, at higher points, a higher mode is generated and $n_{eff}$ in the higher mode is lower than $n_{eff}$ of a lower mode. Also, at the same thickness of the waveguiding layer in the slab waveguide and at the same size of waveguide channels in the channel type waveguide, $n_{eff}$ increases as $n_g^2 - n_{cl}^2$ increases, and at higher points, a higher mode is generated.

The principal waveguide of the waveguide device according to the present invention is provided with a lower cladding layer. A substrate may be provided under the lower cladding layer, and the lower cladding layer may also serve as a substrate. Further a waveguide for optical coupling may be provided with an upper cladding layer. Furthermore, the type of the principal waveguide is not limited and, for example, a slab type waveguide or a channel type waveguide can be used.

In the present invention, materials for the waveguiding layers, cladding layers and waveguide for optical coupling are not limited, and the materials generally used in the technical field of this art can be used. Typical examples of a combination of a material for the waveguiding layer in the principal waveguide with a material for the cladding layers include various ones such as a combination of Corning™ 7059 with Pyrex™ glass; a combination of a glass having inorganic ions ($Ag^+$, $Tl^+$, $K^+$, etc.) diffused therein with another glass without any diffusion; a combination of $LiNbO_3$ having $Ti^+$, $H^+$, $Nb^+$, $Cu^{++}$, etc. diffused therein with $LiNbO_3$; a combination of $Ta_2O_5$, $Nb_2O_5$ or a mixture thereof with $SiO_2$ with glass or $SiO_2$; and a combination of a polymer (polyurethane, epoxy, polymethyl methacrylate, polycarbonate, polystyrene, polyimide, polyamide, photopolymer, etc.) with glass.

In the present invention, the methods for preparing the principal waveguide and the waveguide for optical coupling are not particularly restricted. For example, the principal waveguide can be prepared by the flame assembly method, the spattering method or the ion diffusion method. When $LiNbO_3$ is used as a material therefor, the ion diffusion method may be selected. When a polymer is used as a material therefor, the spin-coating method may be selected. In the case of a channel type waveguide, in particular, the common lithography technique may be used in a combination with these methods. A tapered waveguide for optical coupling can be prepared by various methods. For example, a photopolymer is cured by exposing to light via a photomask, which has a shaded pattern formed by the dither method described in Japanese Patent Application Laid-open (Kokai) Hei-6-126529 and then developed to thereby obtain a tapered shape. Alternatively, a filmy material for the waveguide for optical coupling is first coated and then a photoresist is further coated. Next, it is exposed to light via the above-mentioned photomask with a shaded pattern to thereby impart a tapered shape to the photoresist which is then formed into the desired shape by etching.

Also, the waveguide device of the present invention can be applied to not only input of light to the main waveguide but also output of light from the main waveguide. However, when the device is used for output of light, it is necessary to provide a tapered shape to the waveguiding layer of the main waveguide and the waveguide channel, as shown in FIG. 2. Further, when optical coupling is required in both directions, it is necessary that a tapered shape is provided to the waveguide for optical coupling and the waveguiding layer of the principal waveguide, namely both the waveguide channels as described in FIG. 3 of the present invention or Japanese Patent Application Laid-open (Kokai) No. Sho-63-94205. However, in either case, the requirements defined by formulae (1) and (2) should be satisfied with respect to the tapering angle $\Theta$. The length of the slab type portion of the waveguide for optical coupling shown by $L_1$ in FIG. 1 is not limited, and $L_1$ may be 0.

To further illustrate the present invention in greater detail, the following Example and Test Examples will be given.

Example 1

Figure 1:
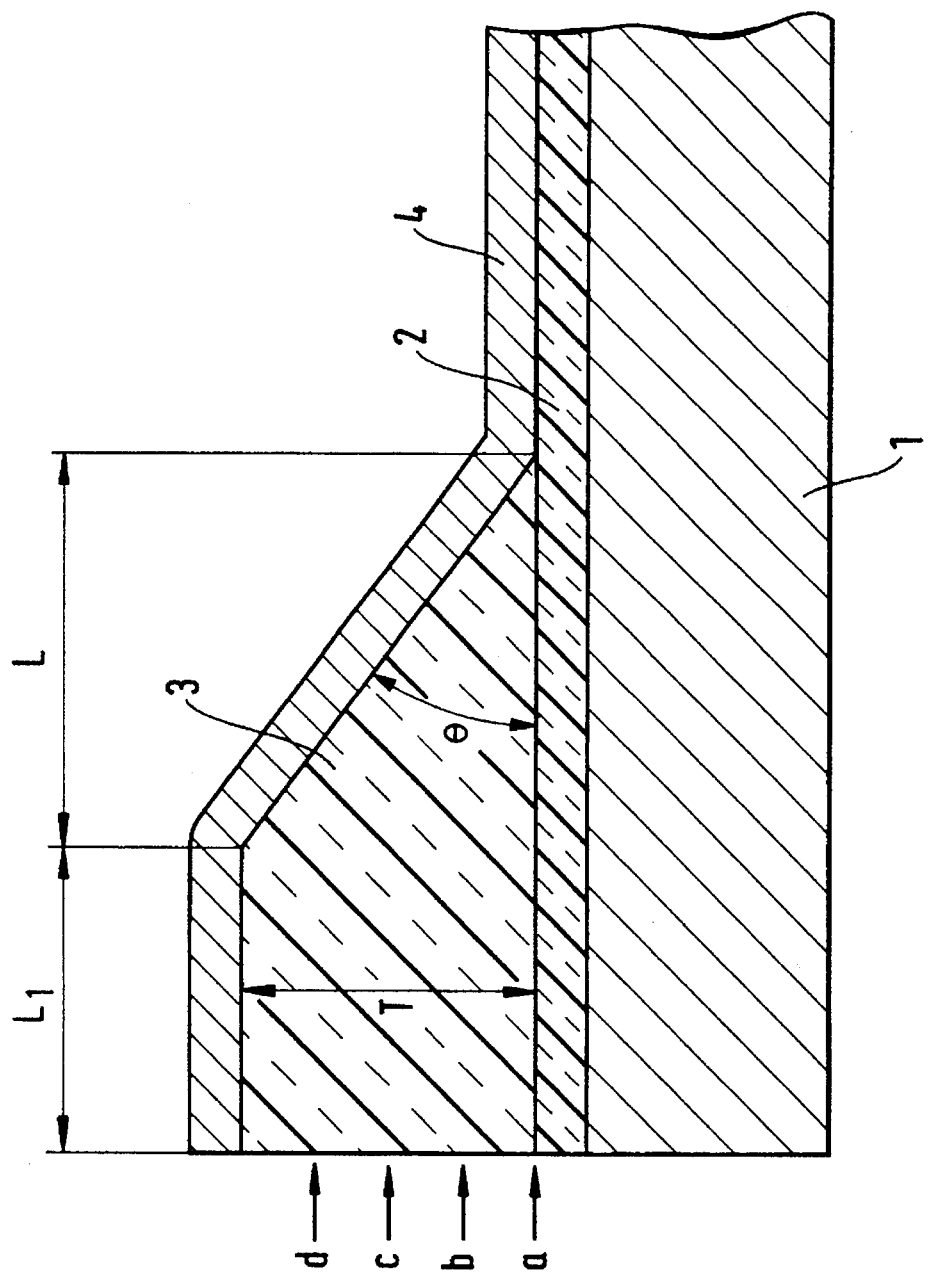
FIG. 1 is a drawing showing a waveguide device having an optical coupling waveguide for light-input and a principal waveguide according to the present invention.
Figure 2:
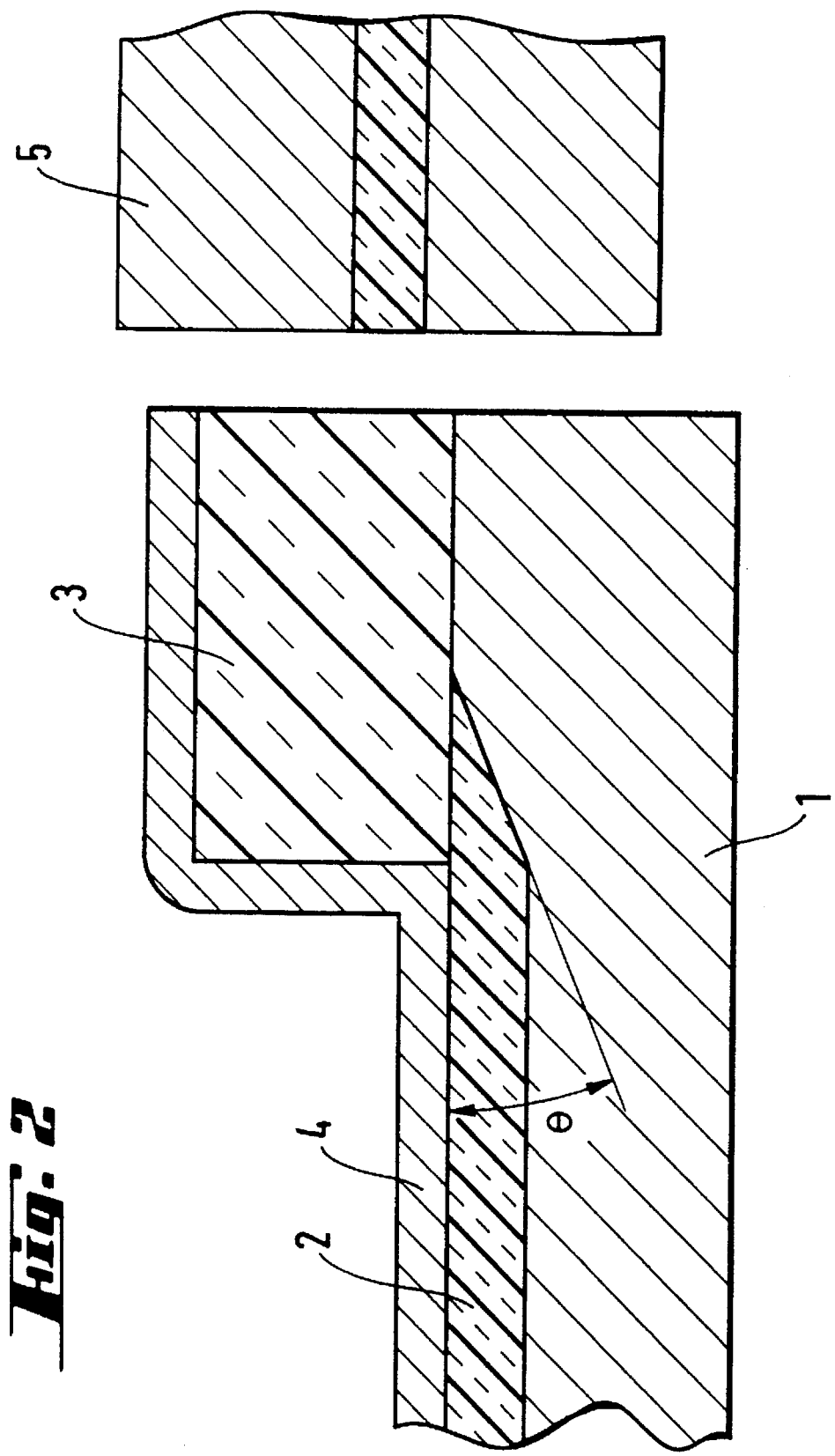
FIG. 2 is a drawing showing a waveguide device having an optical coupling waveguide for light-output and a principal waveguide according to the present invention.

A waveguide device shown in FIG. 1 was prepared by the following method. Methyl methacrylate (MMA) and glycidyl methacrylate (GMA) (molar ratio: 3:7) were dissolved in tetrahydorxyfuran (THF) to thereby give a solution of a monomer concentration of about 10% by weight. By using this solution as a reaction initiator, 2,2'-azobis(isobutyronitrile) (AIBN) was added in an amount of about 2% by mol based on the above-mentioned monomers and reacted under a nitrogen atmosphere at 70° C. for about 5 hours. Next, the polymer thus formed was purified through re-precipitation from methanol and THF. The polymer thus obtained was dissolved in toluene and an excessive amount of cinnamic acid was added thereto. After reacting at 110° C. for about 5 hours, the toluene was eliminated and the obtained polymer was purified by using ethyl acetate and a saturated aqueous solution of sodium hyrogencarbonate. After eliminating the solvent, the polymer and a photopolymerization initiator 2,2-dimethoxyphenylactetophenone (DMPA) were dissolved in cyclohexanone (the resulting solution will be called "the polymer solution A" hereinafter).

A quartz ion exchange waveguide was spin-coated and the solvent was evaporated off on a hot plate. The part to be used as a tapered waveguide for optical coupling was exposed to light with the use of a photomask having a dotted shade pattern. Then the unexposed part was developed with a mixture of methanol with N-methyl-2-pyrrolidone. Further, a solution of polymethyl methacrylate (PMM) in cyclohexanone was spin-coated thereon and the solvent was evaporated off on a hot plate. Thus a cladding layer was formed.

With the waveguide device thus obtained, a light of 1.3 μm from a single mode fiber was coupled. As a result, the resistance against the deviation in the coupling position was elevated, which proved that the coupling efficiency was improved.

Test Example 1

To discuss the effects of the deviation in the position of incident light, the following test was performed.

(1) Discussion on the waveguide device of the present invention

Figure 4:
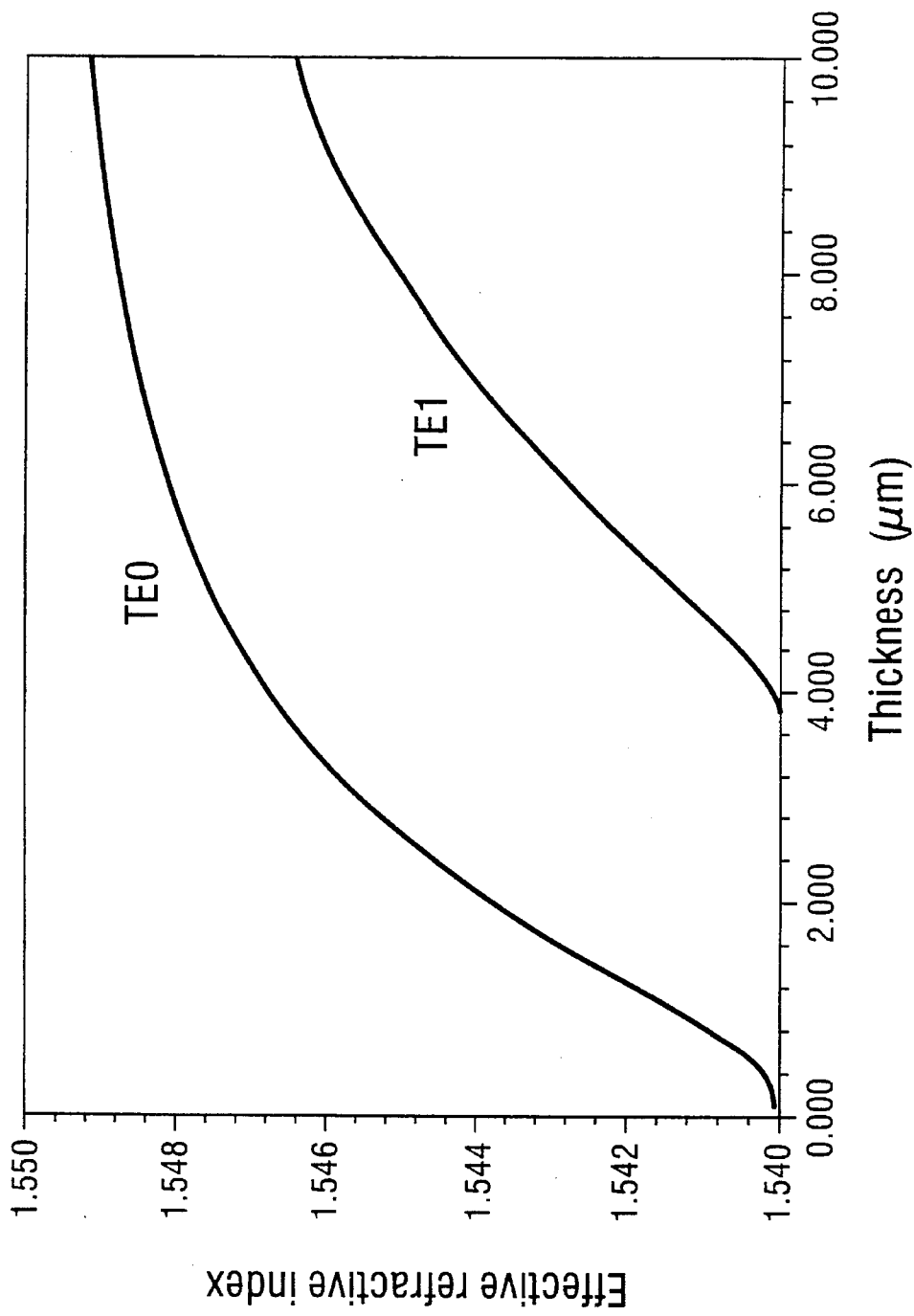
FIG. 4 is a graph showing mode distribution curves relating to a principal waveguide.
Figure 5:
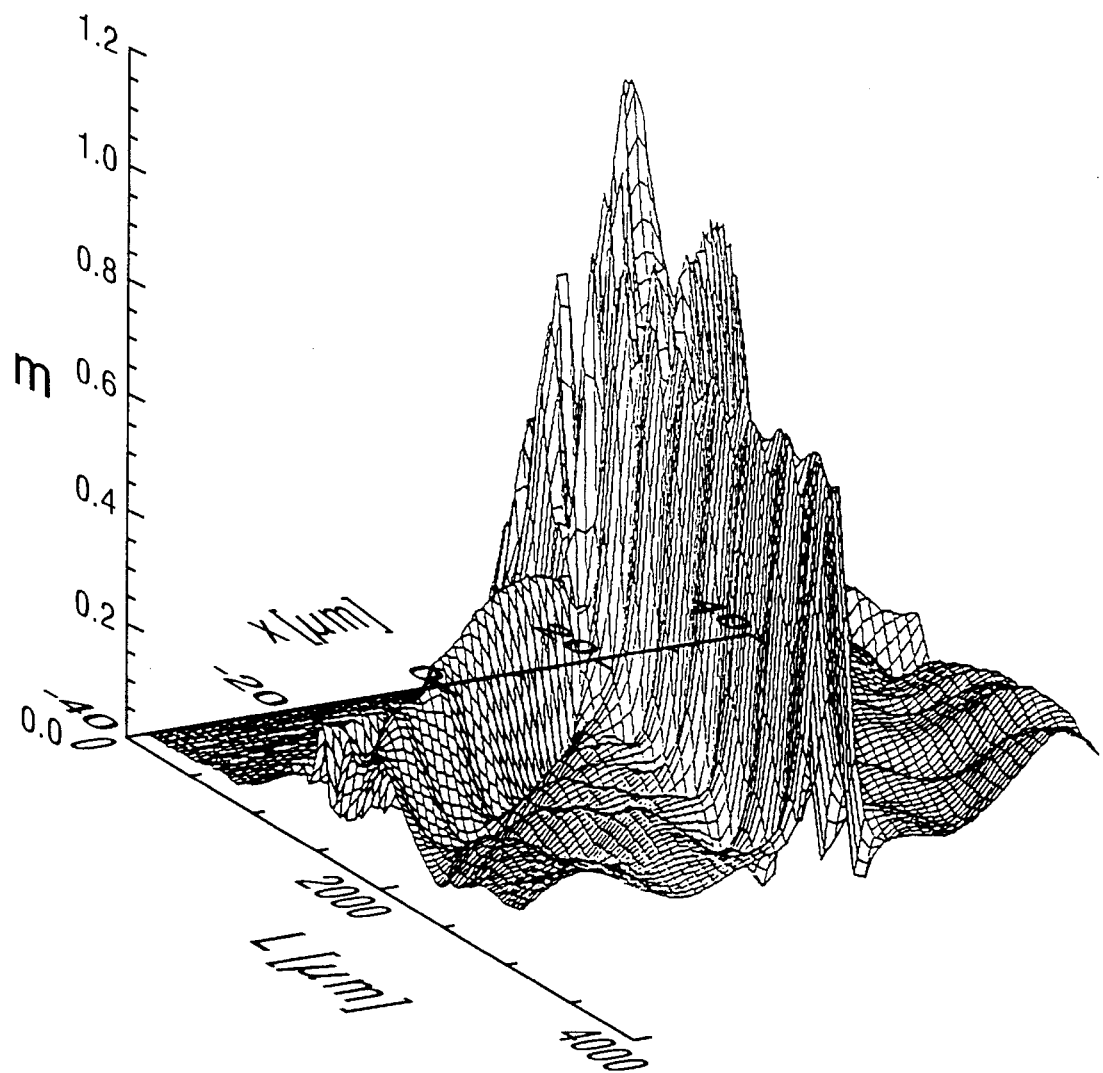
FIG. 5 is a diagram showing the results of calculation of beam propagation.

As FIG. 4 shows, the slab type principal waveguide portion (waveguiding layer) of FIG. 1, which has a refractive index $n_{cl}$ of the substrate 1 of 1.542, a refractive index $n_g$ of the waveguiding layer 2 of 1.550 (these values are typical data of the refractive index of fluorinated polyimide optionally having pigments slightly adhered thereto at a wavelength of 1.32 μm), and a thickness of the waveguiding layer 2 of 4 μm, has two TE modes, i.e., TE0 mode and TE1 mode. The effective refractive index $n_{eff}$ of the TE0 mode was determined as 1.547. The refractive index $n_{cp}$ of the waveguide for optical coupling of this device was adjusted to 1.550 and thus $\Theta_a$ was calculated as 1.7856° in accordance with the formula (1). (The tapering angle $\Theta$ was regulated to the same value.) When the thickness T of the light entrance face of the waveguide for optical coupling was 40 μm, the length L of the waveguide for optical coupling was 1283 μm. In this waveguide device, the beam width of incident light was regulated to 10 μm while the position of the incidence was adjusted to the position b shown in FIG. 1 (namely, 10 μm apart from the boundary between the waveguide for optical coupling and the principal waveguide on the side of the waveguide for optical coupling). Then the beam propagation was calculated in detail by the beam propagation method (BPM). FIG. 5 shows the result thus obtained. (Results similar to the one shown in FIG. 5 were observed in the cases of the various waveguide devices shown below, though these results are not illustrated herein.)

The above procedure was repeated under the same conditions but shifting the position of incidence to the positions a, c and d shown in FIG. 1 (namely, 0, 20 and 30 μm apart from the boundary between the waveguide for optical coupling and the principal waveguide on the side of the waveguide for optical coupling) and calculation was carried out in the same manner. Further, waveguide devices wherein $n_{cp}$, $\Theta$ and L were varied as shown in the following Table were prepared and discussion was made on incident lights on the positions a to d. Table 1 summarizes the coupling loss and the waveguide loss due to coupling calculated for each case.

TABLE 1

| No. | $n_{cp}$ | θ | L (μm) | Incident position | Loss (dB) |
|---|---|---|---|---|---|
| 1 | 1.550 | 1.7856° | 1283 | a | 9.916 |
| 2 | 1.550 | 1.7856° | 1283 | b | 3.673 |
| 3 | 1.550 | 1.7856° | 1283 | c | 4.467 |
| 4 | 1.550 | 1.7856° | 1283 | d | 9.200 |
| 5 | 1.560 | 3.7024° | 618.1 | a | 14.430 |
| 6 | 1.560 | 3.7024° | 618.1 | b | 3.875 |
| 7 | 1.560 | 3.7024° | 618.1 | c | 3.592 |
| 8 | 1.560 | 3.7024° | 618.1 | d | 19.118 |

(2) Discussion on comparative waveguide device

By using a comparative waveguide device having no waveguide for optical coupling but a principal waveguide alone, effects relating to the deviation in the positions of optical fibers were discussed and compared with the waveguide device of the present invention.

In the waveguide device shown in FIG. 6, when the refractive index of the substrate 1 was 1.542, the refractive index of the waveguide layer 2 was 1.550 and the thickness of the waveguide layer 2 was 4 μm, the effective refractive index $n_{eff}$ of this slab type principal waveguide portion was 1.547 in accordance with FIG. 4. The beam width of incident light was regulated to 10 μm and the position of incidence was shifted from the center of the waveguide layer 2 toward the upper cladding layer at each distance as listed in Table 2. Then the beam propagation was calculated in detail. Table 2 summarizes the coupling loss and the waveguide loss due to coupling in each case.

TABLE 2

| No. | Deviation from center (μm) | Loss (dB) |
|---|---|---|
| 9 | 0 | 0.628 |
| 10 | 2 | 1.532 |
| 11 | 4 | 4.102 |
| 12 | 6 | 8.020 |
| 13 | 8 | 11.934 |

Figure 7:
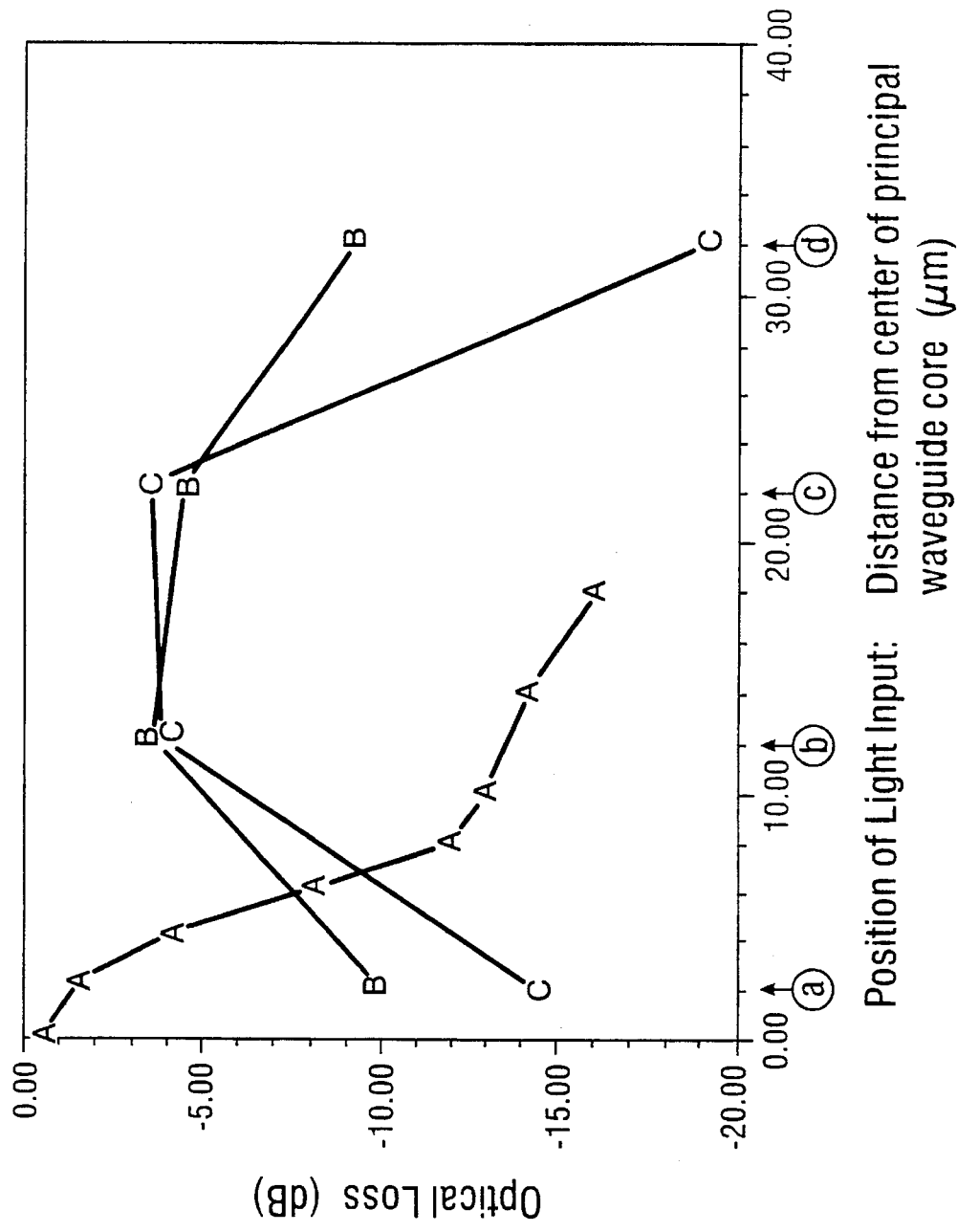
FIG. 7 is a graph showing the loss relative to the deviation of the optical coupling position.

FIG. 7 summarizes these test results. This graph indicates that the waveguide device of the present invention shows a small loss even though the position of the incidental light is largely deviated.

Test Example 2

To confirm the effects of the accuracy of the preparation of the tapered shape, the relation between the tapering angle $\Theta$ and the waveguide loss was discussed.

Under the same conditions as those employed in the above Test Example 1 (1), the change in the waveguide loss was monitored while varying the tapering angle $\Theta$. In FIG. 1, T was fixed to 40 μm, while the tapering angle $\Theta$ was changed by varying the length L. The beam width of the incident light was regulated to 10 μm and the position of incidence was adjusted to the position b in FIG. 1. Thus the bean propagation was calculated in detail. The results are given in Table 3.

TABLE 3

| No. | $\Theta/\Theta_a$ | θ | L (μm) | Loss (dB) |
|---|---|---|---|---|
| 14 | 0.3 | 0.5° | 4585 | 3.689 |
| 15 | 0.8 | 1.4285° | 1604 | 4.054 |
| 16 | 0.9 | 1.6070° | 1426 | 4.327 |
| 17 | 1.1 | 1.9642° | 1166 | 4.291 |
| 18 | 1.2 | 2.1427° | 1069 | 4.131 |
| 19 | 1.4 | 2.5° | 916 | 4.099 |
| 20 | 1.68 | 3.0° | 763 | 5.272 |
| 21 | 1.96 | 3.5° | 653 | 6.916 |
| 22 | 2.2 | 4.0° | 572 | 7.951 |
| 23 | 2.5 | 4.5° | 508 | 8.759 |
| 24 | 2.8 | 5.0° | 457 | 9.658 |

These results are summarized in FIG. 8. This graph indicates that the loss increases with an increase in the tapering angle $\Theta$ and that a tapering angle $\Theta$ twice or more larger than $\Theta_a$, in particular, causes an unacceptably large loss.

Industrial Applicability

The waveguide device of the present invention is excellent in having a high resistance against the deviation in the positions of the light exit face of an LD or an optical fiber and the light entrance face of a waveguide and thus enabling an optical coupling at a high efficiency.

I claim:

1. A waveguide device comprising a cladding layer having a refractive index $n_{cl}$, a first waveguide having a refractive index $n_g$ ($n_g > n_{cl}$) formed on said cladding layer, and a second waveguide having a refractive index $n_{cp}$ ($n_{cp} > n_g$) formed on said first waveguide, wherein the sectional shape of said second waveguide has a tapered structure in which a layer thickness of said second waveguide reduces as the distance from the end face of the second waveguide increases, and a tapering angle $\Theta$ in said tapered structure satisfies the following conditions:

$$\Theta_a = \{90° - \arcsin(n_{eff}/n_{cp})\}/2 \tag{1}$$

$$\Theta < 2.0\, \Theta_a \tag{2}$$

wherein $n_{eff}$ represents an effective refractive index of said first waveguide.

* * * * *